(12) United States Patent
Rosvold

(10) Patent No.: US 9,360,146 B2
(45) Date of Patent: Jun. 7, 2016

(54) PIPE ASSEMBLY AND FLOW ASSURANCE SYSTEM

(71) Applicant: VETCO GRAY SCANDINAVIA AS, Sandvika (NO)

(72) Inventor: Odd Marius Rosvold, Jar (NO)

(73) Assignee: Vetco Gray Scandinavia AS, Sandvika (NO)

( * ) Notice: Subject to any disclaimer, the term of this patent is extended or adjusted under 35 U.S.C. 154(b) by 145 days.

(21) Appl. No.: 14/208,810

(22) Filed: Mar. 13, 2014

(65) Prior Publication Data

US 2014/0270739 A1 Sep. 18, 2014

(30) Foreign Application Priority Data

Mar. 18, 2013 (EP) .................................. 13001356

(51) Int. Cl.
| | | |
|---|---|---|
| *E03B 7/10* | (2006.01) | |
| *F24H 1/10* | (2006.01) | |
| *F16L 53/00* | (2006.01) | |
| *E21B 43/01* | (2006.01) | |
| *F16L 9/19* | (2006.01) | |
| *F16L 55/24* | (2006.01) | |

(52) U.S. Cl.
CPC .................. *F16L 53/00* (2013.01); *E21B 43/01* (2013.01); *F16L 9/19* (2013.01); *F16L 53/008* (2013.01); *F16L 55/24* (2013.01)

(58) Field of Classification Search
None
See application file for complete search history.

(56) References Cited

U.S. PATENT DOCUMENTS

| | | | | |
|---|---|---|---|---|
| 3,782,452 A * | 1/1974 | Ceplon | ................... | F16L 59/13 138/111 |
| 3,791,415 A * | 2/1974 | Lawless | ................ | F16L 53/008 138/127 |
| 3,974,398 A * | 8/1976 | Othmer | .................... | H01B 7/16 307/147 |
| 4,038,519 A * | 7/1977 | Foucras | ................ | A61M 1/369 138/133 |
| 4,717,379 A * | 1/1988 | Ekholmer | ........... | A61M 25/007 604/43 |
| 4,892,996 A * | 1/1990 | Mertes | ................. | F02M 31/125 123/549 |
| 5,156,592 A * | 10/1992 | Martin | ................ | A61M 5/1582 604/175 |
| 5,195,962 A * | 3/1993 | Martin | ................ | A61M 25/001 604/43 |
| 5,342,301 A * | 8/1994 | Saab | ....................... | A61F 7/123 604/103.13 |
| 5,624,392 A * | 4/1997 | Saab | ....................... | A61F 7/123 604/113 |
| 5,713,864 A * | 2/1998 | Verkaart | ................... | A61N 1/02 165/165 |
| 6,955,221 B2 | 10/2005 | Bursaux | | |
| 7,657,163 B2 * | 2/2010 | Martens | .................. | A61M 5/44 392/470 |

(Continued)

FOREIGN PATENT DOCUMENTS

| | | |
|---|---|---|
| DE | 2007009337 | 11/2008 |
| JP | 2009299752 A | 12/2009 |

(Continued)

OTHER PUBLICATIONS

European Search Report from Corresponding European Patent Application No. 13001356.8, dated Feb. 21, 2014.

*Primary Examiner* — Thor Campbell
(74) *Attorney, Agent, or Firm* — GE Global Patent Operation

(57) ABSTRACT

A pipe assembly comprising an outer pipe in surrounding relation about an inner pipe, wherein the inner pipe is suspended in free inner ends of legs extended in an annular space that is formed between the outer and inner pipes, the legs reaching radially towards the inner pipe from an inner periphery of the outer pipe. At least one of the legs carries in its inner end a support foot that is formed with a recess facing towards the inner pipe. The recess forms a tunnel that is defined through an outer periphery of the inner pipe and opposite tunnel walls that reach from the leg to the inner pipe.

20 Claims, 2 Drawing Sheets

(56) References Cited

U.S. PATENT DOCUMENTS

| | | | | |
|---|---|---|---|---|
| 7,711,251 B2* | 5/2010 | Barkey | ..................... | H05B 3/78 392/465 |
| 7,919,733 B2* | 4/2011 | Ellis | ..................... | A16L 53/008 138/112 |
| 2001/0050110 A1* | 12/2001 | Born | ..................... | F16L 53/008 138/111 |
| 2002/0156451 A1* | 10/2002 | Lenker | ..................... | A61M 5/44 604/500 |
| 2003/0059213 A1* | 3/2003 | Mackie | ................. | A61M 16/08 392/480 |
| 2004/0210180 A1* | 10/2004 | Altman | ................ | A61M 1/3653 604/4.01 |
| 2005/0148934 A1* | 7/2005 | Martens | ................ | A61M 5/445 604/113 |
| 2009/0107558 A1* | 4/2009 | Quigley | .................. | F16L 11/12 137/15.01 |

FOREIGN PATENT DOCUMENTS

| | | |
|---|---|---|
| WO | 2009003858 | 1/2009 |
| WO | 2009051495 A1 | 4/2009 |

\* cited by examiner

PIPE ASSEMBLY AND FLOW ASSURANCE
SYSTEM

BACKGROUND OF THE INVENTION

The present invention refers to a pipe-in-pipe assembly that is adapted for transport of fluids. The pipe assembly is specifically useful in a system for long distance transport of hydrocarbon fluid produced in a subsea hydrocarbon production setup, wherein the system comprises flow assurance through wax and hydrate control by cooling and heating. In accordance herewith, the present invention refers also to a flow assurance system comprising the pipe assembly of the present invention.

Long distance transport of hydrocarbons through a pipeline in seawater from a subsea well to a surface or land-based production facility usually involves the task of controlling and removing deposits of wax/paraffin that is dissolved in the hot fluid and precipitate on the inner wall of the pipeline which is cooled by the surrounding sea. The deposits may grow rapidly to cause a reduction of the pipeline cross-section, and may ultimately result in a complete blockage of the pipeline if countermeasures are not applied.

A commonly used method to avoid clogging of the pipeline is to remove wax deposits from the pipeline wall by forcing a solid plug or "pig" through the pipeline, this way mechanically dislodging the wax. The wax is returned as solid particles to the fluid stream for further transport at a temperature below the wax formation temperature.

Another conventional method which aims to prevent solidification of wax involves the addition of wax inhibition chemicals in the fluid stream, near the well head where the fluid is above the wax formation temperature.

Yet another method used is to maintain the fluid stream at a temperature above the wax formation temperature all the way from the well head to a production facility at surface or on land. This method typically involves electrical heating and highly efficient insulation of the pipeline.

In WO 2009051495 A1 Hoffmann et al disclose a method for wax removal and measurement of wax thickness. In a first step, Hoffmann et al suggest cooling the hydrocarbon fluid stream to a temperature below the wax formation temperature, causing precipitation of wax on the pipeline inner wall. In a second step, the pipeline is heated for a limited time period, sufficiently to cause release of the deposited wax from the pipeline wall. The wax is this way dislodged and returned to the fluid stream as solid particles, for further transport at a temperature below the wax formation temperature. To implement the method, Hoffmann et al suggest using a pipe-in-pipe flow system providing an annulus which is flooded with cold water for cooling the inner pipe and initiate precipitation of wax on the wall of the inner pipe. To release the wax the inner pipe may be heated by flooding the annulus with hot water, or the inner pipe may be heated by means of electrical heating using heating cables around the pipe, resistive or inductive heating in the pipe wall.

However, the Hoffmann et al document is not very detailed in its description of the structure and layout of the heated pipe-in-pipe pipeline that is utilized in the cooling and heating process.

In U.S. Pat. No. 6,955,221 B2 Bursaux discloses a pipe-in-pipe flow system for active heating of hydrocarbon liquid that is transported from a subsea wellhead to an above-surface hydrocarbon processing facility. A pipe is placed coaxially within an outer carrier pipe and the annulus between them is filled with thermally insulating material. For purposes of heating the hydrocarbon fluid flowing through the inner pipe, hot water is passed along the annulus via a single pipe or via multiple pipes installed in the insulation-filled annulus, or along an inner annulus formed by a water pipe added concentrically around the hydrocarbon-transporting inner pipe.

However, although Bursaux is detailed with respect to the structural buildup of the pipe-in-pipe flow system, the document lacks guidance regarding installation of electrical heating facilities in the pipe-in-pipe structure.

Another pipe-in-pipe flow system is previously disclosed in the Japanese patent publication JP-A-2009299752. An outer pipe formed of an elastic resin material is extruded about an inner pipe, and a plurality of legs extended in radial directions from the outer pipe to the inner pipe determines the spatial relation between the pipes. Notably, as far as understood, the pipe system of JP-A-2009299752 has no heating facilities installed and is intended for other purpose than flow assurance in hydrocarbon production subsea.

BRIEF SUMMARY OF THE INVENTION

Embodiments of the present invention provide a pipe assembly, and specifically a pipe assembly which is useful in a system for long distance subsea transport of hydrocarbon fluid produced in a subsea hydrocarbon production setup, wherein the system comprises flow assurance through wax and hydrate control by cooling and heating.

This object is met in a pipe assembly comprising an outer pipe in surrounding relation about an inner pipe, wherein the inner pipe is suspended in free inner ends of legs running or extended in an annular space that is formed between the outer and inner pipes, the legs reaching radially towards the inner pipe from an inside periphery of the outer pipe, wherein at least one of the legs in its inner end carries a support foot that is formed with a recess facing towards the inner pipe, and wherein the recess forms a tunnel that is defined through an outer periphery of the inner pipe and opposite tunnel walls that reach from the leg to the inner pipe.

The tunnel formed between the inner pipe and the opposite tunnel walls is configured for receiving and housing an electric heater cable which is this way isolated from the annular space between the outer and inner pipes. The heater cable is installed to extend in close contact with the wall of the inner pipe, from a tunnel entrance to a tunnel exit. The tunnel forms an isolated volume close to the inner pipe wherein the heater cable lies shielded from water that typically occupies the annular space between the pipes. Transfer of heat to the water is this way avoided and the heating energy instead concentrated to the inner pipe.

In an embodiment, at least three legs are arranged in angularly spaced relation about the inner pipe. From a coaxial alignment point of view, in an embodiment, four legs are distributed at equal angular distance about the inner pipe. In an embodiment, each of the four legs comprises a support foot with a tunnel housing an electric heater cable, respectively. Naturally, more legs may be arranged without departing from the teachings provided herein.

The legs, the tunnel(s) and tunnel walls are, in an embodiment, arranged to extend continuously for the full length of the outer and inner pipes.

The legs and tunnel walls may be formed integrally with the outer pipe in a pipe extrusion process. In an embodiment, the outer pipe, legs and tunnel walls are formed as an extruded jacket of synthetic material, such as thermoplastic, adapted for insertion of the inner pipe from an open end of the outer pipe.

By proper choice of material the legs and tunnel walls can be made flexible so as to provide an elastic suspension of the inner pipe. A certain flexibility in legs and tunnel walls permit adjustment to relative movements between the outer and inner pipes, such as caused by strong currents or sudden changes in fluid pressure, e.g., without the tunnel walls loosing contact with the inner pipe. Flexibility in the structure of the outer pipe may also be advantageous to aid in the process of insertion of the inner pipe. A suitable material for extrusion of the outer pipe is a thermoplastic, such as polyethylene (PE), for example.

In an embodiment, the tunnel walls are designed to be cup-shaped in a sectional view. In addition, the ends or edges of the tunnel walls that face the inner pipe may be formed with a radius corresponding substantially to the outer radius of the inner pipe. These measures advantageously provide more efficient seal between the tunnel and the annular space, reducing the risk of penetration of water into the tunnel.

In an embodiment, all legs are designed to be of equal length such that the outer and inner pipes are coaxially aligned. The legs thus divide the annular space between the outer and inner pipes into axially running channels, the channels being connectable to a pump for pumping sea water through the channels for cooling purposes.

The pipe assembly is specifically useful in a flow assurance system configured for wax and hydrate control through cooling and heating of a hydrocarbon production fluid under transport via a pipe assembly section, the pipe assembly section comprising a set of individual outer pipes of limited lengths which are arranged one after the other in the flow direction of hydrocarbon fluid and in surrounding relation about an inner pipe of non-specified or continuous length, and wherein the outer pipes are in flow communication with a pump, the pump operable to flush sea water through the outer pipes such that in every other outer pipe the sea water is flushed in a direction opposite the flow direction of hydrocarbon product fluid through the inner pipe, and further wherein in each pipe assembly section electric heater cables are housed in tunnels which are isolated from the sea water flow and connectable to a common power source.

DESCRIPTION OF THE DRAWINGS

Embodiments of the invention will be further explained below with reference made to the accompanying schematic drawings. In the drawings.

DETAILED DESCRIPTION OF THE EXEMPLARY EMBODIMENTS OF THE INVENTION

Figure 1:
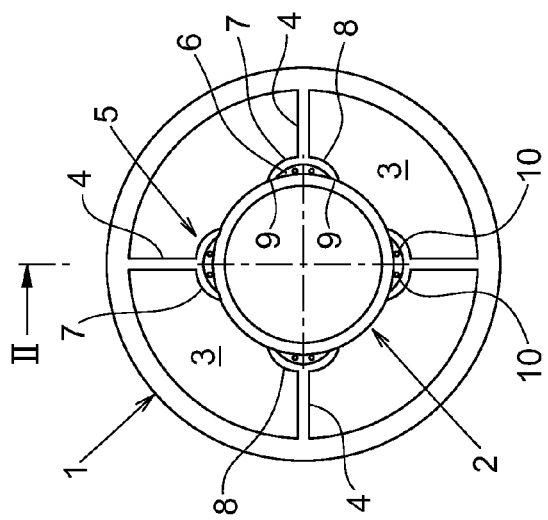
FIG. 1 shows an open end of a pipe assembly in one embodiment of the invention.
Figure 2:
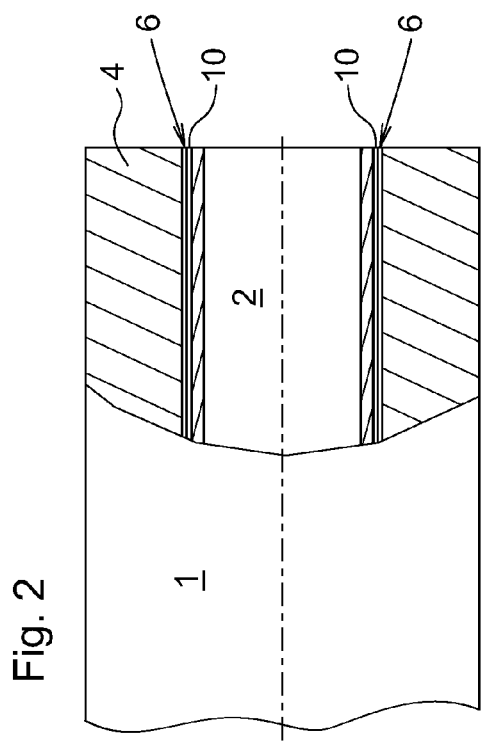
FIG. 2 is a longitudinal section through the pipe assembly of FIG. 1 in accordance with one embodiment of the present invention.
Figure 3:
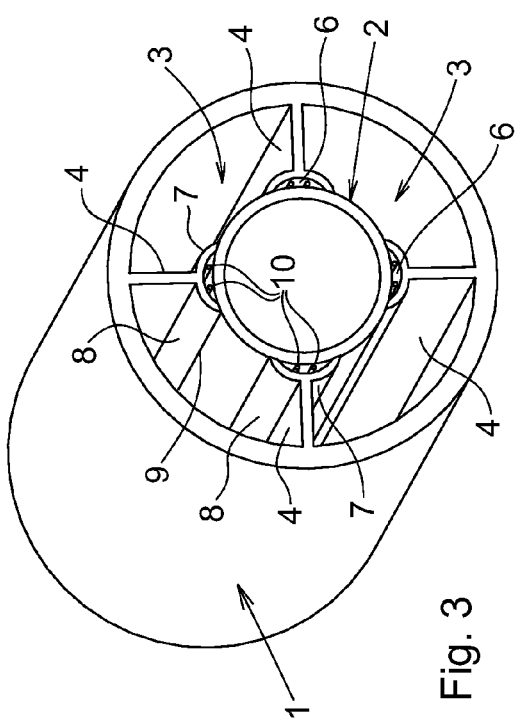
FIG. 3 is a perspective view showing an open end of the pipe assembly in accordance with one embodiment of the present invention.

With reference to the drawings, the pipe assembly comprises an outer pipe 1 in surrounding relation about an inner pipe 2, forming between them an annular volume 3. The inner pipe 2 is suspended in the ends of legs 4 which reach towards the inner pipe from the inner periphery or inside of the outer pipe 1. The legs 4 extend uninterrupted in the longitudinal direction of the outer and inner pipes, the legs forming partition walls which divide the annular volume 3 into parallel sections. The embodiment illustrated in FIGS. 1-3 has four legs 4 which are equally distributed about the inner pipe, the legs dividing the annular volume 3 into four sections having the same sectional area.

Naturally, the number of legs can be varied and the illustrated embodiment disclosing four equally distributed legs is merely exemplifying, in terms of stability and mutual alignment between the outer and inner pipes, and in terms of production and material costs as well.

Each leg 4 comprises a support foot 5 in that end of the leg which supports the inner pipe 2. A recess 6 is formed in that side of the support foot 5 which faces towards the inner pipe 2. The recess forms a tunnel 6 which is defined partly by the outer periphery of the inner pipe 2, and defined partly through opposite tunnel walls 7 and 8 which extend from the leg 4 towards the inner pipe 2. The tunnel walls 7, 8 thus separate and isolate the tunnel 6 from the adjacent sections of the annular volume 3. An improved seal is accomplished by forming the edges 9 of the tunnel walls with a radius that correspond to the outer radius of the inner pipe. An efficient seal is even further enhanced as the tunnel walls are curved and flexible so as to follow, under bias against the inner pipe, any movement of the inner pipe relative to the outer pipe.

The outer pipe 1, the legs 4 and tunnel walls 7, 8 are integrally formed by extrusion of a plastic material such as a thermoplastic polymer material. The outer pipe 1 may be extruded onto a prefabricated inner pipe. Alternatively, the outer pipe may be extruded onto a simultaneously extruded inner pipe in a combined extrusion processes. However, for the discussed subsea implementation, according to an embodiment, the inner pipe 2 is a corrosion resistant steel pipe, which is inserted from the open end of a prefabricated outer pipe 1. A lubricant or a friction reducing coating may be applied on the inner pipe in order to facilitate insertion.

For the purpose of assuring a steady flow of hydrocarbon fluid via the inner pipe 2, electrical heater cables 10 are installed in the tunnels 6 and operable for direct heating of the wall of the inner pipe 2. The heater cables 10 are thus isolated from the annular volume 3 which contain cooling water that is introduced for the purpose of cooling the wall of the inner pipe 2. The cooling water may be sea water which is supplied from a pump station wherein a pump is installed and operable for flooding sea water through the sections of the annular volume 3.

Figure 4:
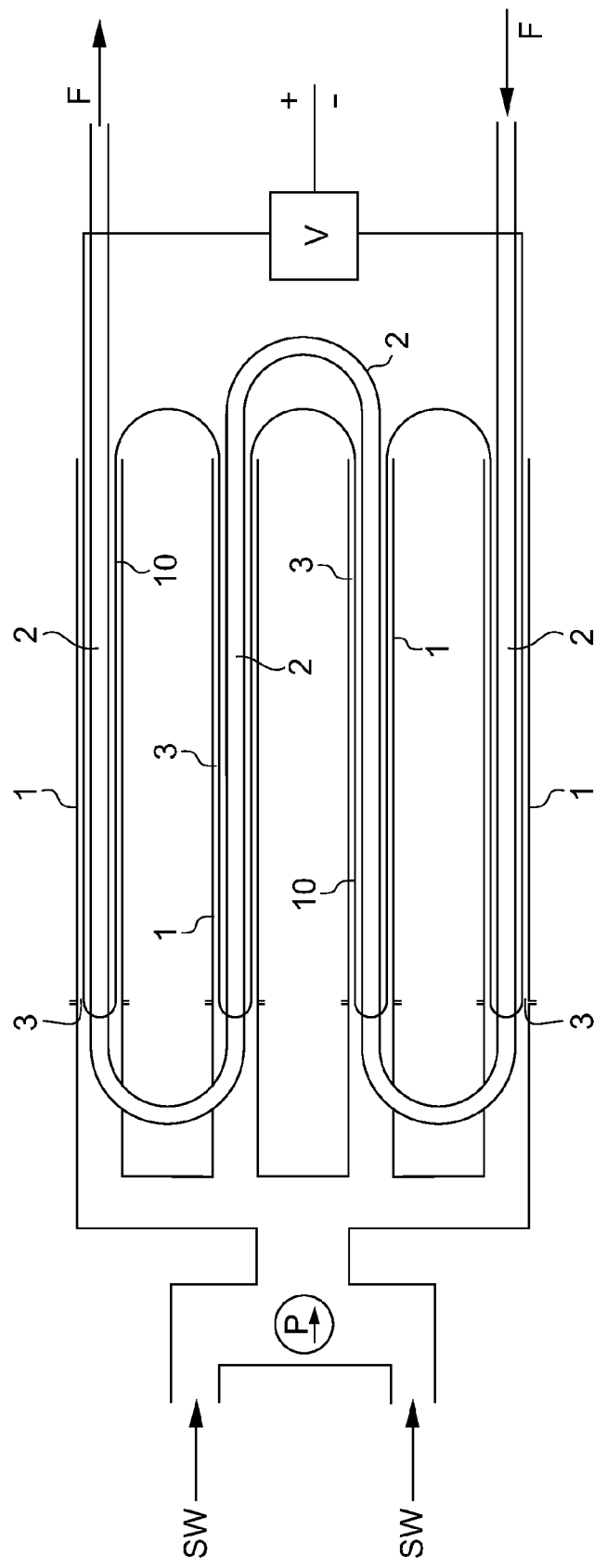
FIG. 4 shows schematically the setup of a subsea flow assurance system in accordance with one embodiment of the present invention.

The pipe assembly 1, 2 is specifically well suited for implementation in a flow assurance system which is set up and configured for wax and hydrate control through cooling and heating of a hydrocarbon fluid under transport via the pipe assembly 1, 2. More precisely, see also FIG. 4, the flow assurance system comprises a set of individual outer pipes 1 of limited lengths which are arranged one after the other in the flow direction F of hydrocarbon fluid and in surrounding relation about an inner pipe 2 of non-specified continuous length. The outer pipes 1 are in flow communication with a pump P, which is operable to flush sea water SW through the annular volumes 3 of the outer pipes. A number of pipe assemblies may be arranged in succession such that in every other pipe assembly the sea water is flushed in a direction opposite the flow direction F of hydrocarbon fluid through the inner pipe. In each pipe system electric heater cables 10 are housed in tunnels 6 which are isolated from the sea water flow in the annular spaces 3. Further, the heater cables 10 are connectable to a common power source V.

The pipe assembly according to embodiments of the present invention supports enhanced flow assurance through a cooling and heating process. The process includes cooling of the fluid stream for solidification and precipitation on the pipe wall of substances which are dissolved in the fluid at higher temperatures. Examples of substances which precipitate from fluids due to thermodynamically induced changes are asphaltenes, paraffins, hydrates, inorganic and organic salts and mixture thereof, e.g. In a successive heating step the pipe wall is heated for a time period sufficiently long to cause the deposited solid particles to be released from the pipe wall and returned to the fluid stream for further transport as solids in a fluid which is now below the solids formation temperature.

Albeit wax and hydrate control through cooling and heating is a process already known per se, the pipe system as disclosed and claimed provides enhanced yield, reduced power consumption and improved economy in long distance subsea transport of well fluid that is prone to wax and hydrate precipitation.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A pipe assembly comprising:
    an outer pipe in surrounding relation about an inner pipe, wherein the inner pipe is suspended in free inner ends of legs extended in an annular space that is formed between the outer and the inner pipes, the legs reaching radially towards the inner pipe from an inner periphery of the outer pipe, wherein at least one leg of the legs in its inner end carries a support foot that is formed with a recess facing towards the inner pipe, and wherein the recess forms a tunnel that is defined through an outer periphery of the inner pipe and opposite tunnel walls that reach from the at least one leg to the inner pipe, wherein the legs and the tunnel walls are flexible and provide an elastic suspension of the inner pipe, and wherein the tunnel walls are cup-shaped in sectional view, and the edges of the tunnel walls that face the inner pipe are formed with a radius corresponding the outer radius of the inner pipe.

2. The pipe assembly of claim 1, wherein the tunnel is configured to house an electric heater cable separated from the annular space between the outer and the inner pipes.

3. The pipe assembly of claim 1, wherein at least three legs are arranged in angularly spaced relation about the inner pipe.

4. The pipe assembly of claim 1, wherein four legs are equally distributed about the inner pipe.

5. The pipe assembly of claim 1, wherein each leg comprises a support foot with a tunnel housing a heater cable, respectively.

6. The pipe assembly of claim 1, wherein the legs, the tunnel, and the tunnel walls are arranged to extend continuously for the full length of the outer and the inner pipes.

7. The pipe assembly of claim 1, wherein the legs and tunnel walls are formed integrally with the outer pipe in an extrusion process.

8. The pipe assembly of claim 1, wherein the outer pipe, the legs, and the tunnel walls form an extruded thermoplastic jacket which is configured for insertion of the inner pipe via an open end of the outer pipe.

9. The pipe assembly of claim 1, wherein all legs are of equal length, and the outer and the inner pipes are coaxially aligned.

10. The pipe assembly of claim 1, wherein the legs divide the annular space between the outer and the inner pipes into axially running channels which are connectable to a pump for pumping sea water through the annular space.

11. A flow assurance system configured for wax and hydrate control through cooling and heating of a hydrocarbon production fluid, the flow assurance system comprising:
    a pipe assembly section configured to transport the hydrocarbon production fluid, the pipe assembly section comprising:
        a set of individual outer pipes of limited lengths arranged one after the other in the flow direction of the hydrocarbon fluid and in surrounding relation about an inner pipe of continuous non-specified length, wherein the outer pipes are in flow communication with a pump configured to flush sea water through the outer pipes such that in every other outer pipe the sea water is flushed in a direction opposite the flow direction of the hydrocarbon product fluid through the inner pipe; and
    electric heater cables housed in tunnels isolated from the sea water flow, and connectable to a common power source.

12. The flow assurance system of claim 11, wherein the inner pipe is suspended in free inner ends of legs extended in an annular space that is formed between the outer and the inner pipes, the legs reaching radially towards the inner pipe from an inner periphery of the outer pipe.

13. The flow assurance system of claim 12, wherein at least one leg of the legs in its inner end carries a support foot that is formed with a recess facing towards the inner pipe.

14. The flow assurance system of claim 13, wherein the recess forms a tunnel that is defined through an outer periphery of the inner pipe and opposite tunnel walls that reach from the at least one leg to the inner pipe.

15. The flow assurance system of claim 14, wherein the legs and the tunnel walls are flexible and provide an elastic suspension of the inner pipe.

16. The flow assurance system of claim 15, wherein the tunnel walls are cup-shaped in sectional view, and the edges of the tunnel walls that face the inner pipe are formed with a radius corresponding to the outer radius of the inner pipe.

17. The flow assurance system of claim 16, wherein the tunnel is configured to house an electric heater cable separated from the annular space between the outer and the inner pipes.

18. The flow assurance system of claim 16, wherein at least three legs are arranged in angularly spaced relation about the inner pipe.

19. The flow assurance system of claim 16, wherein four legs are equally distributed about the inner pipe.

20. The flow assurance system of claim 16, wherein each leg comprises a support foot with a tunnel housing a heater cable, respectively.

* * * * *